United States Patent
Akins et al.

(10) Patent No.: US 7,317,179 B2
(45) Date of Patent: Jan. 8, 2008

(54) SYSTEMS AND METHODS TO SHAPE LASER LIGHT AS A HOMOGENEOUS LINE BEAM FOR INTERACTION WITH A FILM DEPOSITED ON A SUBSTRATE

(75) Inventors: Robert P. Akins, San Diego, CA (US); Richard L. Sandstrom, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 110 days.

(21) Appl. No.: 11/261,845

(22) Filed: Oct. 28, 2005

(65) Prior Publication Data

US 2007/0096008 A1    May 3, 2007

(51) Int. Cl.
*G01B 9/02* (2006.01)

(52) U.S. Cl. ................ 250/201.1; 359/204; 359/345

(58) Field of Classification Search ............ 250/201.1; 356/521; 359/621, 625, 204
See application file for complete search history.

(56) References Cited

U.S. PATENT DOCUMENTS

| | | | |
|---|---|---|---|
| 2,740,963 A | 4/1956 | Donovan et al. ............. 342/34 |
| 4,009,391 A | 2/1977 | Janes et al. ................ 250/281 |
| 4,223,279 A | 9/1980 | Bradford, Jr. et al. ..... 331/94.5 |
| 4,329,664 A | 5/1982 | Javan ......................... 359/276 |
| 4,398,806 A | 8/1983 | Bennett et al. ............. 359/487 |
| 4,410,992 A | 10/1983 | Javan ........................... 372/32 |
| 4,455,658 A | 6/1984 | Sutter, Jr. ..................... 372/38 |
| 4,494,167 A | 1/1985 | Molyneux-Berry ......... 361/270 |
| 4,500,996 A | 2/1985 | Sasnett et al. ................ 372/19 |
| 4,550,408 A | 10/1985 | Karning et al. ............... 372/58 |
| 4,606,034 A | 8/1986 | Eden et al. .................... 372/57 |
| 4,618,759 A | 10/1986 | Muller et al. ............... 219/121 |
| 4,696,792 A | 9/1987 | Hobson ...................... 376/377 |
| 4,716,013 A | 12/1987 | Veronesi et al. ............ 376/353 |
| 4,723,256 A | 2/1988 | Hoag ........................... 372/93 |
| 4,757,511 A | 7/1988 | Klingel et al. ................ 372/58 |
| 4,764,339 A | 8/1988 | Lake et al. .................. 376/353 |
| 4,770,846 A | 9/1988 | Land et al. .................. 376/353 |

(Continued)

FOREIGN PATENT DOCUMENTS

JP            2601410            1/1997

(Continued)

OTHER PUBLICATIONS

U.S. Appl. No. 10/606,412, filed Jun. 2003, Saethre et al.

(Continued)

*Primary Examiner*—Georgia Epps
*Assistant Examiner*—Tony Ko
(74) *Attorney, Agent, or Firm*—Matthew Hillman (57) ABSTRACT

Systems and methods are disclosed for shaping and homogenizing a laser beam for interaction with a film. The shaping and homogenizing system may include a lens array and a lens that is positioned to receive laser light from the lens array and produce a respective elongated image in a plane for each lens in the lens array. In addition, the system may include a beam stop having an edge that is positioned in the plane, and a moveable mount rotating a lens of the lens array to vary an alignment between one of the elongated images and the beam stop edge.

22 Claims, 4 Drawing Sheets

U.S. PATENT DOCUMENTS

| | | | | |
|---|---|---|---|---|
| 4,891,820 | A | 1/1990 | Rando et al. | 372/93 |
| 4,902,998 | A | 2/1990 | Pollard | 336/60 |
| 4,959,840 | A | 9/1990 | Akins et al. | 372/57 |
| 4,983,859 | A | 1/1991 | Nakajima et al. | 307/419 |
| 5,005,180 | A | 4/1991 | Edelman et al. | 372/57 |
| 5,017,499 | A | 5/1991 | Hakuta et al. | 436/124 |
| 5,022,033 | A | 6/1991 | Hackell | 372/25 |
| 5,023,884 | A | 6/1991 | Akins et al. | 372/57 |
| 5,025,445 | A | 6/1991 | Anderson et al. | 372/20 |
| 5,025,446 | A | 6/1991 | Kuizenga | 372/21 |
| 5,090,020 | A | 2/1992 | Bedwell | 372/59 |
| 5,091,778 | A | 2/1992 | Keeler | 348/31 |
| 5,100,609 | A | 3/1992 | Oosterkamp | 376/210 |
| 5,113,408 | A | 5/1992 | Bihler | 372/93 |
| 5,142,543 | A | 8/1992 | Wakabayashi et al. | 372/32 |
| 5,149,659 | A | 9/1992 | Hakuta et al. | 436/55 |
| 5,157,684 | A | 10/1992 | Benda et al. | 372/95 |
| 5,181,135 | A | 1/1993 | Keeler | 398/104 |
| 5,189,678 | A | 2/1993 | Ball et al. | 372/28 |
| 5,313,481 | A | 5/1994 | Cook et al. | 372/37 |
| 5,315,611 | A | 5/1994 | Ball et al. | 372/56 |
| 5,325,407 | A | 6/1994 | Forsyth et al. | 376/205 |
| 5,329,350 | A | 7/1994 | Wright et al. | 356/218 |
| 5,329,398 | A | 7/1994 | Lai et al. | 359/566 |
| 5,359,620 | A | 10/1994 | Akins | 372/58 |
| 5,416,391 | A | 5/1995 | Correa et al. | 318/558 |
| 5,425,922 | A | 6/1995 | Kawaguchi | 422/186 |
| 5,432,122 | A | 7/1995 | Chae | 437/101 |
| 5,440,578 | A | 8/1995 | Sandstrom | 372/59 |
| 5,448,580 | A | 9/1995 | Birx et al. | 372/38 |
| 5,450,436 | A | 9/1995 | Mizoguchi et al. | 372/59 |
| 5,463,650 | A | 10/1995 | Ito et al. | 372/57 |
| 5,471,965 | A | 12/1995 | Kapich | 123/565 |
| 5,543,916 | A | 8/1996 | Kachanov | 356/451 |
| 5,563,555 | A | 10/1996 | Nalos et al. | 331/81 |
| 5,642,374 | A | 6/1997 | Wakabayashi et al. | 372/57 |
| 5,754,579 | A | 5/1998 | Mizoguchi et al. | 372/58 |
| 5,771,258 | A | 6/1998 | Morton et al. | 372/57 |
| 5,835,520 | A | 11/1998 | Das et al. | 372/57 |
| 5,852,621 | A | 12/1998 | Sandstrom | 372/25 |
| 5,856,991 | A | 1/1999 | Ershov | 372/58 |
| 5,863,017 | A | 1/1999 | Larson et al. | 248/176.1 |
| 5,891,764 | A | 4/1999 | Ishihara et al. | 438/151 |
| 5,933,271 | A | 8/1999 | Waarts et al. | 356/341.31 |
| 5,936,988 | A | 8/1999 | Partlo et al. | 372/38 |
| 5,940,421 | A | 8/1999 | Partlo et al. | 372/38 |
| 5,946,330 | A | 8/1999 | Ozygus et al. | 372/19 |
| 5,953,360 | A | 9/1999 | Vitruk et al. | 372/87 |
| 5,978,394 | A | 11/1999 | Newman et al. | 372/32 |
| 5,978,406 | A | 11/1999 | Rokni et al. | 372/58 |
| 5,982,800 | A | 11/1999 | Ishihara et al. | 372/57 |
| 5,991,324 | A | 11/1999 | Knowles et al. | 372/57 |
| 5,999,555 | A | 12/1999 | Connors et al. | 372/99 |
| 6,005,879 | A | 12/1999 | Sandstrom et al. | 372/25 |
| 6,014,398 | A | 1/2000 | Hofmann et al. | 372/60 |
| 6,016,323 | A | 1/2000 | Kafka et al. | 372/38 |
| 6,016,325 | A | 1/2000 | Ness et al. | 372/38 |
| 6,018,537 | A | 1/2000 | Hofmann et al. | 372/25 |
| 6,028,880 | A | 2/2000 | Carlesi et al. | 372/58 |
| 6,067,306 | A | 5/2000 | Sandstrom et al. | 372/38 |
| 6,067,311 | A | 5/2000 | Morton et al. | 372/57 |
| 6,094,448 | A | 7/2000 | Fomenkov et al. | 372/102 |
| 6,104,735 | A | 8/2000 | Webb | 372/37 |
| 6,128,323 | A | 10/2000 | Myers et al. | 372/38 |
| 6,130,904 | A | 10/2000 | Ishihara et al. | 372/59 |
| 6,143,661 | A | 11/2000 | Kousai et al. | 438/689 |
| 6,151,346 | A | 11/2000 | Partlo et al. | 372/38 |
| 6,151,349 | A | 11/2000 | Gong et al. | 372/58 |
| 6,151,350 | A | 11/2000 | Komori et al. | 372/59 |
| 6,157,662 | A | 12/2000 | Scaggs et al. | 372/60 |
| 6,160,831 | A | 12/2000 | Kleinschmidt et al. | 372/57 |
| 6,163,010 | A | 12/2000 | Kobsa | 219/121.61 |
| 6,164,116 | A | 12/2000 | Rice et al. | 73/1.72 |
| 6,177,301 | B1 | 1/2001 | Jung | 438/150 |
| 6,181,719 | B1 | 1/2001 | Sukhman et al. | 372/38.1 |
| 6,188,710 | B1 | 2/2001 | Besaucele et al. | 372/60 |
| 6,192,064 | B1 | 2/2001 | Algots et al. | 372/99 |
| 6,208,674 | B1 | 3/2001 | Webb et al. | 372/57 |
| 6,208,675 | B1 | 3/2001 | Webb | 372/58 |
| 6,212,211 | B1 | 4/2001 | Azzola et al. | 372/33 |
| 6,212,214 | B1 | 4/2001 | Vogler et al. | 372/59 |
| 6,215,595 | B1 | 4/2001 | Yamazaki et al. | 359/623 |
| 6,219,368 | B1 | 4/2001 | Govorkov | 372/59 |
| 6,240,117 | B1 | 5/2001 | Gong et al. | 372/58 |
| 6,243,406 | B1 | 6/2001 | Heist et al. | 372/59 |
| 6,281,471 | B1 | 8/2001 | Smart | 219/121.62 |
| 6,300,176 | B1 | 10/2001 | Zhang et al. | 438/166 |
| 6,314,119 | B1 | 11/2001 | Morton | 372/57 |
| 6,316,338 | B1 | 11/2001 | Jung | 438/487 |
| 6,317,447 | B1 | 11/2001 | Partlo et al. | 372/57 |
| 6,317,448 | B1 | 11/2001 | Das et al. | 372/60 |
| 6,322,625 | B2 | 11/2001 | Im | 117/43 |
| 6,330,261 | B1 | 12/2001 | Ishihara et al. | 372/38.1 |
| 6,330,267 | B1 | 12/2001 | Vogler et al. | 372/59 |
| 6,359,922 | B1 | 3/2002 | Partlo et al. | 372/58 |
| 6,368,945 | B1 | 4/2002 | Im | 438/487 |
| 6,370,174 | B1 | 4/2002 | Onkel et al. | 372/38.04 |
| 6,373,623 | B1 | 4/2002 | Ohshima et al. | 359/341.3 |
| 6,381,257 | B1 | 4/2002 | Ershov et al. | 372/57 |
| 6,389,052 | B2 | 5/2002 | Albrecht et al. | 372/58 |
| 6,393,042 | B1 | 5/2002 | Tanaka | 372/101 |
| 6,396,856 | B1 | 5/2002 | Sucha et al. | 372/25 |
| 6,407,836 | B1 | 6/2002 | Fukushima | 398/178 |
| 6,414,979 | B2 | 7/2002 | Ujazdowski et al. | 372/87 |
| 6,440,785 | B1 | 8/2002 | Yamazaki et al. | 438/164 |
| 6,442,181 | B1 | 8/2002 | Oliver et al. | 372/25 |
| 6,448,534 | B1 | 9/2002 | Kobsa | 219/121.72 |
| 6,456,380 | B1 | 9/2002 | Naganuma | 356/450 |
| 6,466,365 | B1 | 10/2002 | Maier et al. | 359/355 |
| 6,466,602 | B1 | 10/2002 | Fleurov et al. | 372/87 |
| 6,477,192 | B2 | 11/2002 | Govorkov et al. | 372/57 |
| 6,477,193 | B2 | 11/2002 | Oliver et al. | 372/58 |
| 6,490,307 | B1 | 12/2002 | De Mos et al. | 372/59 |
| 6,490,308 | B2 | 12/2002 | Albrecht et al. | 372/59 |
| 6,493,364 | B1 | 12/2002 | Baumler et al. | 372/15 |
| 6,493,370 | B2 | 12/2002 | Albrecht et al. | 372/58 |
| 6,493,374 | B1 | 12/2002 | Fomenkov et al. | 372/102 |
| 6,501,061 | B1 | 12/2002 | Kitai et al. | 250/205 |
| 6,504,861 | B2 | 1/2003 | Albrecht et al. | 372/59 |
| 6,507,422 | B1 | 1/2003 | Fukushima | 398/78 |
| 6,529,531 | B1 | 3/2003 | Everage et al. | 372/20 |
| 6,529,533 | B1 | 3/2003 | Voss | 372/29.01 |
| 6,532,247 | B2 | 3/2003 | Spangler et al. | 372/61 |
| 6,535,531 | B1 | 3/2003 | Smith et al. | 372/25 |
| 6,538,737 | B2 | 3/2003 | Sandstrom et al. | 356/333 |
| 6,539,046 | B2 | 3/2003 | Newman et al. | 372/98 |
| RE38,054 | E | 4/2003 | Hofmann et al. | 372/25 |
| 6,549,551 | B2 | 4/2003 | Ness et al. | 372/98 |
| 6,553,049 | B1 | 4/2003 | Besaucele et al. | 372/57 |
| 6,555,449 | B1 | 4/2003 | Im et al. | 438/487 |
| 6,556,600 | B2 | 4/2003 | Sandstrom et al. | 372/25 |
| 6,560,254 | B2 | 5/2003 | Stamm | 372/32 |
| 6,563,077 | B2 | 5/2003 | Im | 219/121.65 |
| 6,563,853 | B2 | 5/2003 | Heist et al. | 372/57 |
| 6,567,450 | B2 | 5/2003 | Myers et al. | 372/55 |
| 6,573,531 | B1 | 6/2003 | Im et al. | 257/45 |
| 6,577,380 | B1 | 6/2003 | Sposili et al. | 355/67 |
| 6,582,827 | B1 | 6/2003 | Im | 428/446 |
| 6,584,132 | B2 | 6/2003 | Morton | 372/57 |
| 6,611,336 | B1 | 8/2003 | Walmsley et al. | 356/450 |
| 6,618,421 | B2 | 9/2003 | Das et al. | 372/55 |
| 6,621,846 | B1 | 9/2003 | Sandstrom et al. | 372/57 |
| 6,624,424 | B2 | 9/2003 | Eckert et al. | 250/372 |
| 6,625,191 | B2 | 9/2003 | Knowles et al. | 372/55 |

| | | | | |
|---|---|---|---|---|
| 6,638,800 | B1 | 10/2003 | Ishihara et al. | 438/166 |
| 6,671,294 | B2 | 12/2003 | Kroyan et al. | 372/20 |
| 6,687,562 | B2 | 2/2004 | Patel et al. | 700/121 |
| 6,690,704 | B2 | 2/2004 | Fallon et al. | 372/58 |
| 6,693,939 | B2 | 2/2004 | Klene et al. | 372/58 |
| 6,704,340 | B2 | 3/2004 | Ershov et al. | 372/58 |
| 6,721,340 | B1 | 4/2004 | Fomenkov et al. | 372/25 |
| 6,750,972 | B2 | 6/2004 | Sandstrom et al. | 356/454 |
| 6,757,316 | B2 | 6/2004 | Newman et al. | 372/57 |
| 6,765,945 | B2 | 7/2004 | Sandstrom et al. | 372/57 |
| 6,782,031 | B1 | 8/2004 | Hofmann et al. | 372/90 |
| 6,795,474 | B2 | 9/2004 | Partlo et al. | 372/57 |
| 6,798,812 | B2 | 9/2004 | Rylov et al. | 372/55 |
| 6,853,653 | B2 | 2/2005 | Spangler et al. | 372/20 |
| 6,865,210 | B2 | 3/2005 | Ershov et al. | 372/55 |
| 6,879,617 | B2 | 4/2005 | Ariga et al. | 372/55 |
| 6,882,674 | B2 | 4/2005 | Wittak et al. | 372/58 |
| 6,928,093 | B2 | 8/2005 | Webb et al. | 372/25 |
| 7,002,443 | B2 | 2/2006 | Ness et al. | 336/57 |
| 2001/0012309 | A1 | 8/2001 | Albrecht et al. | 372/55 |
| 2001/0020195 | A1 | 9/2001 | Patel et al. | 700/121 |
| 2001/0050931 | A1 | 12/2001 | Keiji | 372/25 |
| 2002/0006149 | A1 | 1/2002 | Spangler et al. | 372/61 |
| 2002/0012376 | A1 | 1/2002 | Das et al. | 372/58 |
| 2002/0021728 | A1 | 2/2002 | Newman et al. | 372/55 |
| 2002/0048288 | A1 | 4/2002 | Kroyan et al. | 372/20 |
| 2002/0101589 | A1 | 8/2002 | Sandstrom et al. | 356/334 |
| 2002/0101902 | A1 | 8/2002 | Albrecht et al. | 372/58 |
| 2002/0105994 | A1 | 8/2002 | Partlo et al. | 372/22 |
| 2002/0110174 | A1 | 8/2002 | Albrecht et al. | 372/58 |
| 2002/0114370 | A1 | 8/2002 | Onkels et al. | 372/55 |
| 2002/0154668 | A1 | 10/2002 | Knowles et al. | 372/55 |
| 2002/0154671 | A1 | 10/2002 | Knowles et al. | 372/57 |
| 2002/0162973 | A1 | 11/2002 | Cordingley et al. | 250/492.2 |
| 2002/0167975 | A1 | 11/2002 | Spangler et al. | 372/20 |
| 2002/0167986 | A1 | 11/2002 | Pan et al. | 372/55 |
| 2002/0186739 | A1 | 12/2002 | Sandstrom et al. | 372/55 |
| 2003/0012234 | A1 | 1/2003 | Watson et al. | 372/25 |
| 2003/0016363 | A1 | 1/2003 | Sandstrom et al. | 356/452 |
| 2003/0018072 | A1 | 1/2003 | Wittak et al. | 514/527 |
| 2003/0031216 | A1 | 2/2003 | Fallon et al. | 372/29.01 |
| 2003/0058429 | A1 | 3/2003 | Schriever | 355/133 |
| 2003/0096489 | A1 | 5/2003 | Im et al. | 438/487 |
| 2003/0099269 | A1 | 5/2003 | Ershov et al. | 372/55 |
| 2003/0118072 | A1 | 6/2003 | Wittak et al. | 372/58 |
| 2003/0119286 | A1 | 6/2003 | Im et al. | 438/487 |
| 2003/0138019 | A1 | 7/2003 | Rylov et al. | 372/58 |
| 2003/0219094 | A1 | 11/2003 | Basting et al. | 378/34 |
| 2004/0022293 | A1 | 2/2004 | Rule et al. | 372/58 |
| 2004/0047385 | A1 | 3/2004 | Knowles et al. | 372/55 |
| 2004/0060504 | A1 | 4/2004 | Takeda et al. | 117/84 |
| 2005/0109743 | A1 | 5/2005 | Tanabe et al. | 219/121.73 |
| 2005/0174576 | A1 | 8/2005 | Rao et al. | 356/454 |
| 2005/0180005 | A1* | 8/2005 | Hwang | 359/457 |
| 2006/0209310 | A1* | 9/2006 | Muenz | 356/521 |

FOREIGN PATENT DOCUMENTS

| | | |
|---|---|---|
| JP | 09-097951 | 4/1997 |
| JP | 2701184 | 10/1997 |
| JP | 410003045 | 1/1998 |
| JP | 10-074993 | 3/1998 |
| JP | 2000-022255 | 1/2000 |
| JP | 2001-332793 | 11/2001 |
| JP | 2002-208746 | 7/2002 |
| JP | 3297108 | 7/2002 |
| JP | 2002-294856 | 10/2002 |

OTHER PUBLICATIONS

U.S. Appl. No. 10/607,407, filed Jun. 2003, Ness et al.
U.S. Appl. No. 10/712,545, filed Nov. 2003, Webb et al.

Burnett et al., "Symmetry of spatial-dispersion-induced birefringence and its implications of CaF2 ultraviolet optics," J. Microlith., Microsyst., vol. 1, No. 3, Oct. 2002.

Crowther et al., "A fly's eye condenser system for uniform illumination," Proc. of SPIE, International Optical Design Conference 2002, vol. 4832 (2002), pp. 4832-4835.

Dainesi et al., Optimization of a beam delivery system for a short-pulse KrF laser used for material ablation.

Dassow et al., "YVO4 laser crystallization for thin film transistors with a high mobility," Mat. Res. Soc. Sympo., Proc. vol. 621, pp. 9.3.1-9.3.6, (2000).

Ewing et al., Phys. Rev. A12, 129 (1975).

Furuta et al., "Bottom-gate poly-si thin film transistors using XeCl excimer laser annealing an dion doping techniques," IEEE Trans. Electron Devices, vol. 40, No. 14 (1993) pp. 1964-1969.

Gerlach et al., "Brewster window and windowless resonant spectrophones for intracavity operation", App. Phys. 23:319-326 (1980).

Hoffman et al., Appl: Phys. Lett. 9, 538 (1976).

Kahlert et al., "High-resolution optics for thin Si-film crystallization using excimer lasers: present status and future development," Proc. or SPIE-IS&T, Electronic Imaging, SPIE vol. 5004 (2003), pp. 20-27.

Kim et al., "Excimer-laser crystallized poly-si TFT's with transparent gate, IEEE transactions on electron devices", vol. 43, No. 4 (Apr. 1996), pp. 576-579.

Kudo et al., "Advanced lateral crystal growth of a Si thin films by double-pulsed irradiation of all solid-state lasers", Mat. Res. Soc. Symp. Proc. vol. 792, pp. A16.5.1-A16.5.6, (2003).

Lee, "A study on laser annealed polycrystalline silicon thin film transistors (TDTs) with SiNx gate insulator," Chapter 4, Experimental Details, http://tftlcd.kyunghee.ac.kr/research/poly-Si/chaper4.html.

Lee, "A study on laser annealed polycrystalline silicon thin film transistors (TFTs) with SiNx gate insulator," Chaper 5, Electrical and Structural Properties of ELA Poly-Si Films, http://tftlcd.khu.ac.kr/research/poly-Si/chapter5.html.

Morita et al., "UV pulsed laser annealing of Si implanted silicon film and low-temperature super thin-film transistors," Jpn. J. Appl. Phys., vol. 28, No. 2 (1989) pp. L309-L311.

Mstnews Feb. 2003, http://www.suss-microoptics.com/downloads/Publications/Miniaturization_of _Imaging_System.pdf.

Ozaki et al., Cylindrical fly's eye lens for intensity redistribution of an excimer laser beam, Applied Optics, vol. 28, Issue 1 (Jan. 1989) p. 106.

Rosengren, "Optimal Optoacoustic Detector Design", Applied Optics 14(8):1961-1976 (Aug. 1975).

Sera et al., "High-performance TFT's fabricated by XeCl excimer laser annealing of hydrogenated amorphous-silicon film," IEEE Transactions on Electron Devices, vol. 36, Np. 12, (1989), pp. 2868-2872.

Shimizu et al., "On-chip bottom gate polysilicon and amorphous silicon thin-film transistors using excimer laser annealed silicon nitride gate," Jpn. J. Appl. Phys., vol. 29, No. 10 (1990), pp. L1775-1777.

Sun et al., "Excimer laser annealing process for polysilicon TFT AMLCD application," Record of 1994 Int.-Disp. Res. Conf. (1994), pp. 134-147.

Voutsas, "A new era of crystallization: Advances in polysilicon crystallization and crystal engineering," applied Surface Science, 208-209, pp. 250-262, (2003).

Voutsas et al., "Effect of process parameters on the structural characteristics of laterally grown, laser-annealed polycrystalline silicon films," Jour. Of. Appld. Phys., vol. 94, No. 12 (Dec. 15, 2003).

Wexler et al., "Use of XeCl amplifiers for degenerate four wave mixing", American Institute of Physics, Excimer Lasers—1983, C. Rhodes, et al. Editors, pp. 164-171, (1983).

Yres et al., "Low temperature poly-Si for liquid crystal display addressing," Philips Research Laboratories, Surrey, England, (May 11, 1993); http://www.atip.org/ATIP/public/atip.reports.93/mitalcd.93.html.

* cited by examiner

SYSTEMS AND METHODS TO SHAPE LASER LIGHT AS A HOMOGENEOUS LINE BEAM FOR INTERACTION WITH A FILM DEPOSITED ON A SUBSTRATE

CROSS-REFERENCE TO RELATED APPLICATIONS

The present invention is related to U.S. application Ser. No. 10/781,251, titled "VERY HIGH ENERGY, HIGH STABILITY GAS DISCHARGE LASER SURFACE TREATMENT SYSTEM," filed on Feb. 18, 2004, to U.S. application Ser. No. 10/884,101, titled "LASER THIN FILM POLY-SILICON ANNEALING OPTICAL SYSTEM," filed on Jul. 1, 2004, and to U.S. application Ser. No. 11/138,001, titled "SYSTEMS AND METHODS FOR IMPLEMENTING AN INTERACTION BETWEEN A LASER SHAPED AS A LINE BEAM AND A FILM DEPOSITED ON A SUBSTRATE" filed on May 26, 2005, the disclosures of each of which are hereby incorporated by reference herein.

FIELD OF THE INVENTION

The present invention relates to systems and methods for shaping laser light as a line beam. Uses of laser light that has been shaped as a line beam may include, but are not necessarily limited to; the melting of an amorphous silicon film to crystallize the film for the purpose of manufacturing thin film transistors (TFT's), the non-melt laser annealing of silicon to produce black silicon for use in photovoltaic cells; and the non-melt laser annealing of silicon wafer layers to activate implants (e.g. boron) and/or remove damage to the silicon lattice due to the implant.

BACKGROUND OF THE INVENTION

Laser crystallization of an amorphous silicon film that has been deposited on a substrate, e.g., glass, represents a promising technology for the production of material films having relatively high electron mobilities. Once crystallized, this material can then be used to manufacture thin film transistors (TFT's) and in one particular application, TFT's suitable for use in relatively large liquid crystal displays (LCD's). Other applications for crystallized silicon films may include Organic LED (OLED), System on a Panel (SOP), flexible electronics and photovoltaics. In more quantitative terms, high volume production systems may be commercially available in the near future capable of quickly crystallizing a film having a thickness of about 90 nm and a width of about 700 mm or longer.

Laser crystallization may be performed using pulsed laser light that is optically shaped to a line beam, e.g., laser light that is focused in a first axis, e.g., the short-axis, and expanded in a second axis, e.g., the long-axis. Typically, the first and second axes are mutually orthogonal and both axes are substantially orthogonal to a central ray traveling toward the film. An exemplary line beam for laser crystallization may have a beam width at the film of less than about 20 microns, e.g. 3-4 microns, and a beam length of about 700 mm. With this arrangement, the film can be scanned or stepped in a direction parallel to the beam width to sequentially melt and crystallize a film having a substantial length, e.g., 900 mm or more.

In some cases, e.g. sequential lateral solidification processes, it may be desirable to ensure that the silicon film is exposed using a beam having an intensity that is relatively uniform across the short-axis and that drops off sharply at the short-axis edges (i.e. a beam having relatively steep, short-axis sidewalls). More specifically, failure to obtain a steep sidewall on the trailing short-axis edge may result in the undesirable crystal quality of new grains near the short-axis edge due to insufficient overlap between adjacent pulses. Also, in some implementations, it may be desirable to have a steep sidewall on the leading short-axis edge to reduce surface variations and provide more consistent lateral growth. One way to achieve this desired beam shape is to focus a laser beam at a short-axis stop, e.g. field stop, which is shaped as an elongated slit and aligned in the direction of the long-axis. An optic may then be used to produce an image of the short-axis stop at the film. With this arrangement, a beam having relatively steep, short-axis sidewalls may be obtained.

In some cases, it may be desirable to ensure that each portion of the silicon film is exposed to an average laser energy density that is controlled within a preselected energy density range during melting. In particular, energy density control within a preselected range is typically desired for locations along the shaped line beam, and a somewhat constant energy density is desirable as the line beam is scanned relative to the silicon film. High energy density levels may cause the film to flow resulting in undesirable "thin spots", a non-flat surface profile and poor grain quality. This uneven distribution of film material is often termed "agglomeration" and can render the crystallized film unsuitable for certain applications. On the other hand, low energy density levels may lead to incomplete melting and result in poor grain quality. By controlling energy density, a film having substantially homogeneous properties may be achieved.

Laser beam homogenization is a common practice used in various laser applications such as lithography to produce a beam having a fairly uniform intensity across the beam. However, for applications such as the one described above which contemplate a line beam having a long-axis length of 700 mm or more, common methods of beam homogenization may be insufficient to produce a beam having suitable uniformity. More specifically, past methods have primarily used monolithic lenslet arrays (so-called fly's eye arrays) in combination with a Fourier lens to produce a somewhat uniform beam in the far field of the Fourier lens. However, the individual lenses of the lenslet array often contain defects, and thus, do not bend the incoming laser light in a desired manner. For the case when the type and location of the defects are randomly distributed throughout the array, the impact of the defects may not be very severe because they tend to average out. On the other hand, when each lens in the array contains the same type of defect in the same location, the results do not average out, and instead, the result may be an inhomogeneous beam unsuitable for use as a 700 mm long line beam. Moreover, due to manufacturing techniques that are typically employed to produce monolithic lenslet arrays, (polishing from a single piece of glass) these non-random defects are often present in the arrays rendering these prior art homogenization systems unsuitable for certain applications.

With the above in mind, applicants disclose systems and methods for shaping laser light as a homogeneous line beam for interaction with a film deposited on a substrate.

SUMMARY OF THE INVENTION

Systems and methods are provided for shaping and homogenizing a laser beam for interaction with a film in which the beam travels along a beam path and defines a short-axis and a long-axis, with the axes being mutually orthogonal. The shaping and homogenizing system may include a lens array and a lens that is positioned to receive laser light from the lens array and produce a respective elongated image in a plane for each lens in the lens array. In addition, the system may include a short-axis beam stop having an edge that is positioned in the plane, and a moveable mount rotating a lens of the lens array to vary an alignment between one of the elongated images and the beam stop edge. An optic may be positioned along the beam path between the beam stop and the film for focusing the beam in the short-axis, and may expand the beam in the long-axis, for interaction with the film.

In a particular embodiment, the lens array may be a linear array of cylindrical lenses and may include moveable mounts rotating each lens of the lens array to vary an alignment between each elongated images and the beam stop edge. Moreover, in some implementations, a pair of opposed short-axis beam stops may be employed with the edge of one short-axis beam stop being oriented substantially parallel to and distanced from the edge of the short-axis beam stop to establish a slit between the first and second short-axis beam stops.

In another aspect, the system may further include one or more detectors that are positioned to receive light downstream of the short axis stop and measure an intensity profile for the received light. The detector(s) may then generate signal(s) indicative of the intensity profile which are then forwarded to the moveable mount(s). For this aspect, the moveable mount(s) are configured to be responsive to the signal(s) to rotate the lens(es) and reduce intensity variations in the measured profile.

DETAILED DESCRIPTION OF PREFERRED EMBODIMENTS

Figure 1:
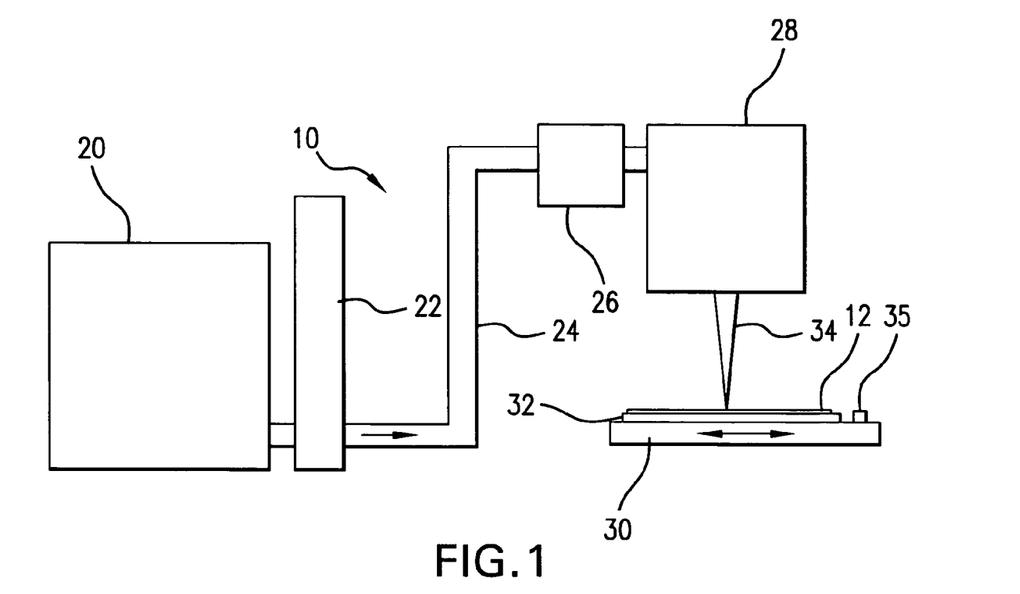
FIG. 1 shows a schematic view of the primary components of an exemplary production system for crystallizing an amorphous silicon film.

Referring initially to FIG. 1, there is shown a schematic, not to scale, view of the primary components of a production system, designated generally system 10, for crystallizing an amorphous silicon film 12. As shown, the system 10 may include a laser source 20 for generating a pulsed laser beam, a pulse stretcher 22 for increasing pulse duration and a beam delivery unit 24 which may have a mechanism to actively steer the beam and/or an active beam expander.

In overview, the laser source 20 may be a two-chamber laser having a power oscillator and a power amplifier, and accordingly, is often referred to as a so-called POPA laser source. In one implementation of the crystallization process described above, a 6 Khz (6000 pulses per second) POPA laser may be used with pulse energies of approximately 150 mJ. With this arrangement, a 730 mm×920 mm film may be processed (with 60 percent overlap) in about 75 seconds. The power oscillator and the power amplifier each may comprise a discharge chamber which may contain two elongated electrodes, a suitable laser gas, e.g., XeCl, XeF, a tangential fan for circulating the gas between the electrodes and one or more water-cooled finned heat exchangers (not shown).

It is to be appreciated that other types of laser sources could be used in the system 10, to include solid state lasers, excimer lasers having one chamber, excimer lasers having more than two chambers, e.g., an oscillator chamber and two amplifying chambers (with the amplifying chambers in parallel or in series), or a solid state laser that seeds one or more excimer amplifying chambers. Other designs are possible. Further details for a two chamber, gas discharge, pulsed laser source 20, can be found in U.S. application Ser. No. 10/631,349, entitled CONTROL SYSTEM FOR A TWO CHAMBER GAS DISCHARGE LASER, filed on Jul. 30, 2003, U.S. Ser. No. 10/356,168, entitled AUTOMATIC GAS CONTROL SYSTEM FOR A GAS DISCHARGE LASER, filed on Jan. 31, 2003, U.S. Ser. No. 10/740,659, entitled METHOD AND APPARATUS FOR CONTROLLING THE OUTPUT OF A GAS DISCHARGE MOPA LASER SYSTEM, filed on Dec. 18, 2003, U.S. Ser. No. 10/676,907, entitled GAS DISCHARGE MOPA LASER SPECTRAL ANALYSIS MODULE filed on Sep. 30, 2003, U.S. Ser. No. 10/676,224, entitled OPTICAL MOUNTINGS FOR GAS DISCHARGE MOPA LASER SPECTRAL ANALYSIS MODULE, filed Sep. 30, 2003, U.S. Ser. No. 10/676,175, entitled GAS DISCHARGE MOPA LASER SPECTRAL ANALYSIS MODULE, filed Sep. 30, 2003, U.S. Ser. No. 10/631,349, entitled CONTROL SYSTEM FOR A TWO CHAMBER GAS DISCHARGE LASER, filed Jul. 30, 2003, U.S. Ser. No. 10/627,215, entitled VERY NARROW BAND, TWO CHAMBER, HIGH REP-RATE GAS DISCHARGE LASER, filed on Jul. 24, 2003, U.S. Ser. No. 10/607,407, entitled METHOD AND APPARATUS FOR COOLING MAGNETIC CIRCUIT ELEMENTS, filed on Jun. 25, 2003, U.S. Ser. No. 10/922,692, entitled TIMING CONTROL FOR TWO-CHAMBER GAS DISCHARGE LASER SYSTEM, filed on Aug. 20, 2004, U.S. Pat. No. 6,625,191, entitled HIGH REP RATE MOPA LASER SYSTEM, and U.S. Pat. No. 6,567,450, entitled BASIC MODULAR MOPA LASER SYSTEM, the disclosures of all of which are hereby incorporated by reference herein.

Continuing with FIG. 1, the system 10 may further include a stabilization metrology module 26 for measuring one or more beam characteristics, e.g., wavefront and/or beam pointing, and generating control signals for use by the active steering unit and/or the active beam expander. System 10 may also include an optics module 28 for beam homogenization, beam shaping and/or beam focusing, and a moveable stage system 30 for holding and positioning a silicon film 12 that has been deposited on a substrate 32, which can be, for example, glass. A layer of buffer material (not shown) may be interposed between the glass and the silicon layer.

In overview, the system 10 shown in FIG. 1 and described in greater detail below may be configured to generate a focused thin beam 34, e.g. line beam, having a width at the film 12 of about 20 microns or less (short-axis), e.g. 3-4 microns, and a length of 700 mm or more (long-axis) and a depth of focus (DOF) of about +/−30 to 50 microns. Each pulse of the focused thin beam can be used to melt a strip of amorphous silicon, and after the end of the pulse, the molten strip crystallizes. In particular, the molten strip crystallizes in a lateral growth process in which grains grow in a direction parallel to the short-axis. Grains grow inward (parallel to the short-axis) from both edges and meet creating a ridge (a so-called grain boundary protrusion) along the center of the strip which extends out of the plane of the silicon film. The stage is then moved, either incrementally or continuously, to expose a second strip that is parallel to and overlaps a portion of the first strip. During exposure, the second strip melts and subsequently crystallizes. An overlap sufficient to re-melt the ridge may be used. By re-melting the ridge, a relatively flat film surface (e.g., peak- to-peak value of ~15 nm) may be maintained. This process, which is hereinafter referred to as thin-beam, directional crystallization (TDX) is typically repeated until the entire film is crystallized.

FIG. 1 also shows that the system 10 may include a detector 35, such as a line beam camera, for measuring an intensity of the beam 34. As shown, the detector 35 may be mounted on the stage system for movement therewith allowing the detector 35 to be scanned along the long-axis of the beam 34. With this arrangement, the detector 35 may be used to determine an intensity profile of the beam 34 along the long-axis of the beam.

Figure 2:
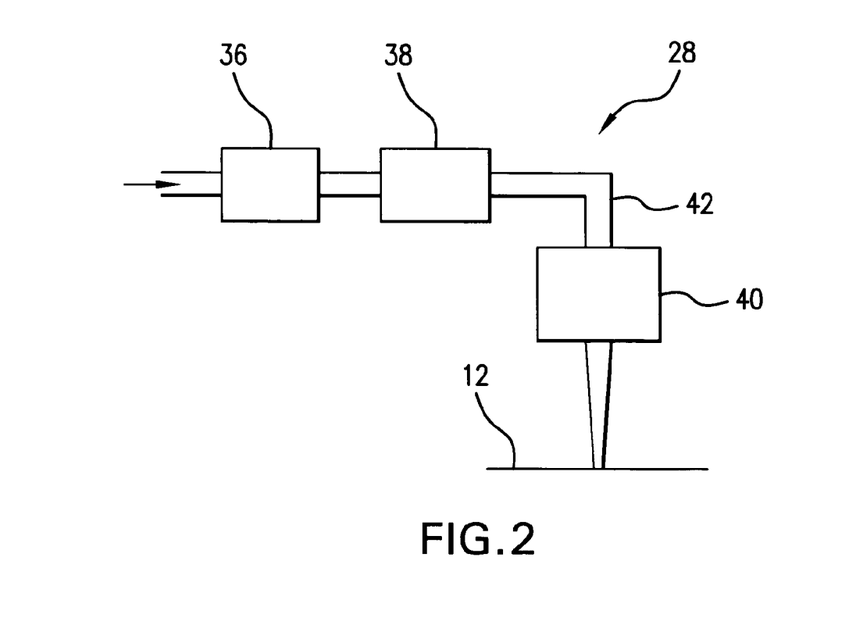
FIG. 2 shows a schematic view of an optics module for beam homogenization, beam shaping and/or beam focusing.

FIG. 2 shows an example of an optics module 28 which may include a short-axis homogenizing unit 36, a shaping and long-axis homogenizing unit 38 and a short-axis focusing/long-axis expanding optics unit 40, all of which are arranged along a common beam path 42. When used, the short-axis homogenizing unit 36 may include one or more optics, e.g. lens arrays, distributed delay devices, rotating diffuser etc., for homogenizing the beam in the short-axis.

Figure 3A:
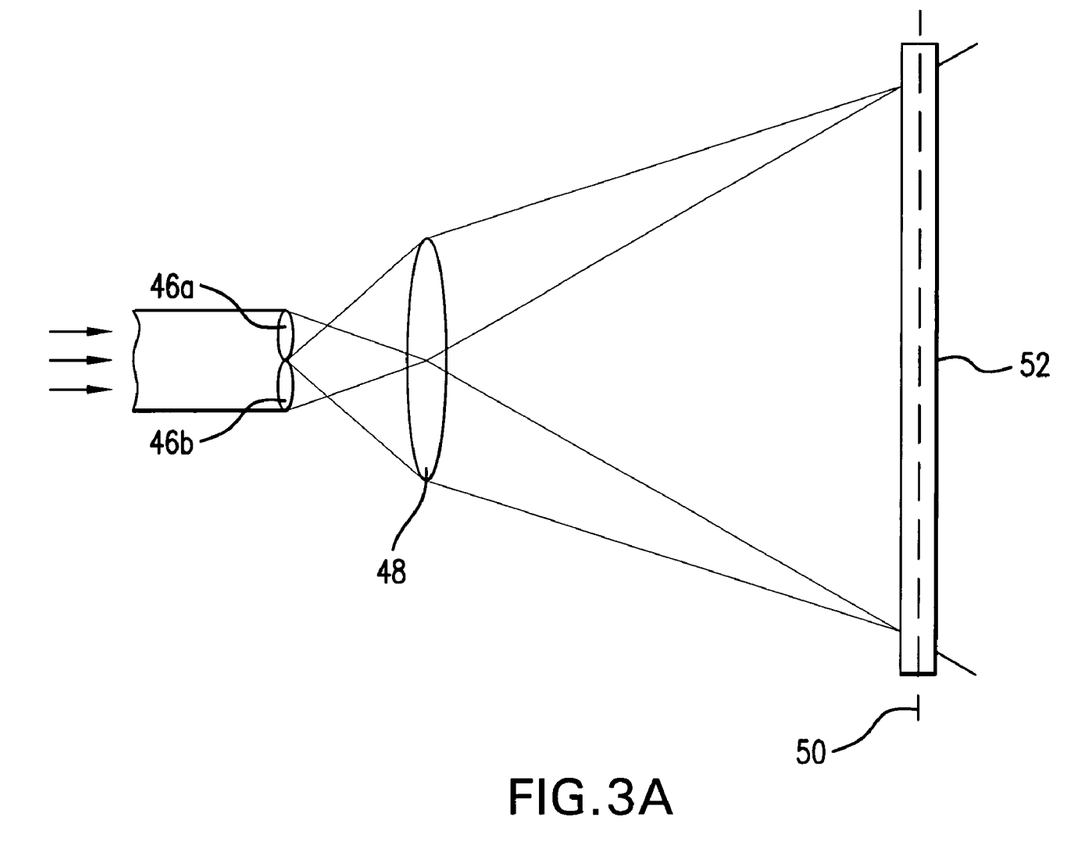
FIG. 3A is a schematic view of an embodiment of a shaping and long-axis homogenizing unit.

FIG. 3A shows an example of an embodiment of a shaping and long-axis homogenizing unit 38 in more detail. As seen there, the shaping and long-axis homogenizing unit 38 may include a lens array having lenses 46a,b. Although two lenses are shown for the lens array, it is to be appreciated that the lens array may include more than two and as few of one lens. For the unit 38, the lens array interacts with a Fourier lens 48 to produce a respective elongated image in a Fourier plane 50 for each lens 46a,b in the array. FIG. 3 further shows that the shaping and long-axis homogenizing unit 38 may include a short-axis beam stop 52 having an edge (see FIG. 6) that is positioned in the plane 50.

Figure 3B:
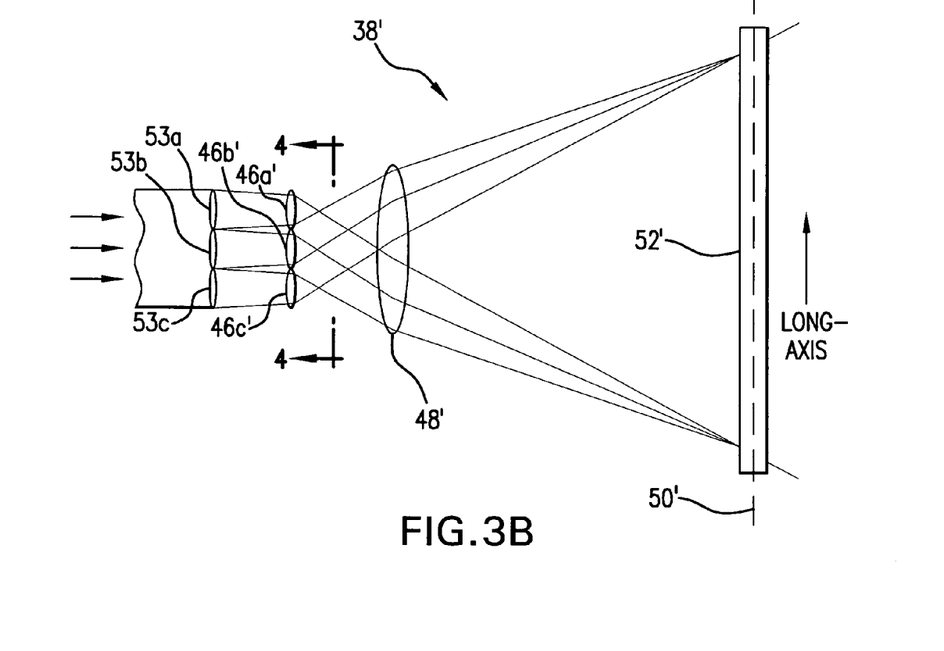
FIG. 3B is a schematic view of another embodiment of a shaping and long-axis homogenizing unit.

FIG. 3B shows another example of an embodiment of a shaping and long-axis homogenizing unit 38'. As shown there, the shaping and long-axis homogenizing unit 38' may include a relatively weak lens array having three cylindrical lenses 53a-c which receive light (e.g. laser light) and direct the light onto a relatively strong lens array having three cylindrical lenses 46a'-c'. Although three lenses are shown for each array, it is to be appreciated that each array may include more than three and as few of one lens. Typically, the weak lens array functions to slightly concentrate the light such that the edges of the strong lens array are not illuminated. The strong lens array, on the other hand, interacts with a Fourier lens 48' to produce a respective elongated image in a Fourier plane 50' for each lens 46a'-c' in the array. FIG. 3B further shows that the shaping and long-axis homogenizing unit 38' may include a short-axis beam stop 52' having an edge (see FIG. 6) that is positioned in the plane 50'.

Figure 4:
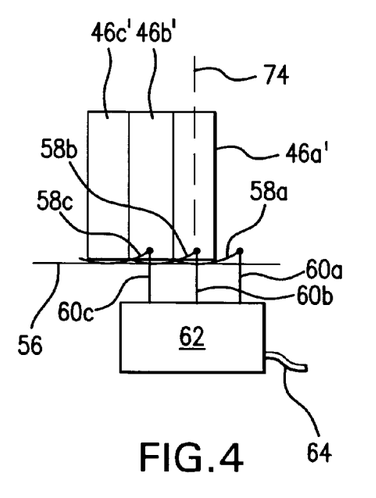
FIG. 4 shows a schematic view of a lens array and a plurality of moveable mounts for independently rotating each lens of the array.
Figure 5:
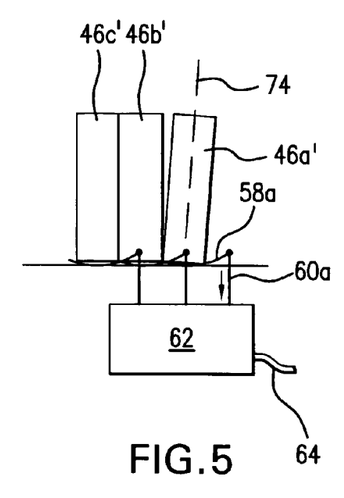
FIG. 5 shows a schematic view as in FIG. 4 after a rotation of one of the lenses.
Figure 6:
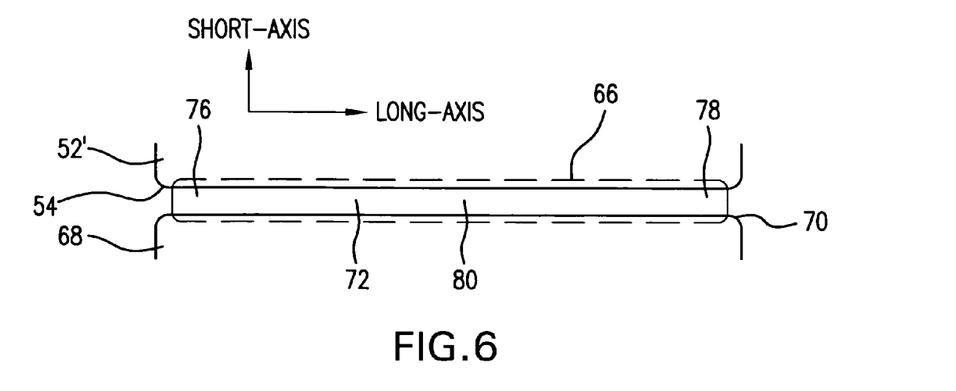
FIG. 6 shows a schematic view of a beam portion from a non-rotated lens of a lens array at a short-axis beam stop.

FIG. 4 shows a schematic of a simplified moveable mount 56 for independently rotating each lens 46a'-c' (note: a similar moveable mount may be used to independently rotate each lens 46a,b for the embodiment shown in FIG. 3A). For the simplified mount 56 shown, each lens 46a'-c' is mounted on a respective cradle 58a-c, each of which can be selectively rocked, back and forth, by the linear translation of a respective rod 60a-c. The rods 60a-c, in turn, can be controlled via actuator 62 in response to one or more signal inputs transmitted over cable 64. FIG. 5 illustrates the rotation of lens 46a' which results from the translation of rod 60a by actuator 62. The effect of this rotation can be appreciated with reference to FIGS. 6 and 7. As illustrated in FIG. 6, each lens 46a'-c' of the lens array produces an elongated image 66. FIG. 6 further shows that the shaping and long-axis homogenizing unit 38 may include a pair of opposed short-axis beam stops 52, 68 having respective edges 54, 70 and may be configured with the edge 54 of short-axis beam stop 52 being oriented substantially parallel to and distanced from the edge 70 of the short-axis beam stop 68 to establish a slit 72 between the short-axis beam stops 52, 68.

The effect of rotating lens 46a' of the lens array to vary an alignment between its corresponding image in the plane 50 and the beam stop edges 54, 70 can best be appreciated with cross reference to FIGS. 4-7. In particular, FIG. 6 shows the image corresponding to lens 46a' in FIG. 4. As shown in FIG. 4, lens 46a' has not been rotated, and as a consequence, is aligned with the cylinder axis 74 parallel to the short-axis. The resultant elongated image 66 shown in FIG. 6 is substantially parallel to the long-axis, and the edges 54, 70 of the beam stops 52, 68, as shown. However, as indicated above, defects in the lens 46a' may cause the intensity of the image 66 to vary along the long axis. For example, the intensity may be higher at the edges 76, 78 than at the midpoint 80. For the image 66 produced by a non-rotated lens 46a', FIG. 6 shows that the beam stops 52, 68 trim the beam uniformly along the long-axis. Thus, for the image 66, any non-uniformities that are present along the long-axis of the beam pass through, and remain present downstream of, the beam stops 52, 68.

Figure 7:
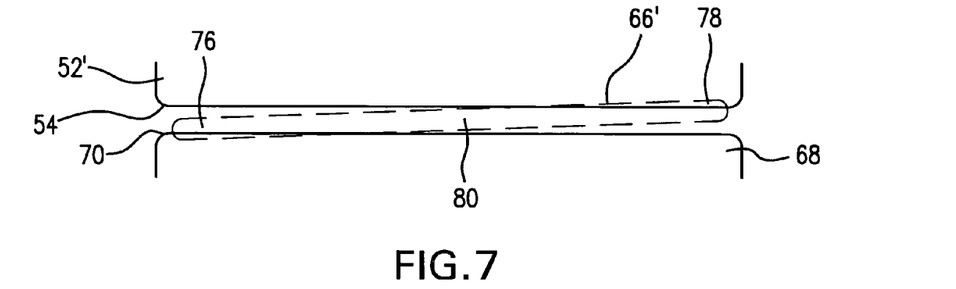
FIG. 7 shows a schematic view of a beam portion from a rotated lens of a lens array at a short-axis beam stop.

FIG. 7 shows the image corresponding to lens 46a' in FIG. 5. As shown in FIG. 5, lens 46a' has been rotated, and as a consequence, has a cylinder axis 74 that is non-parallel to the short-axis. The resultant elongated image 66' shown in FIG. 7 is non-parallel to the long-axis, and as a consequence, is non-parallel to the edges 54, 70 of the beam stops 52, 68, as shown. Again, defects in the lens 46a' may cause the intensity of the image 66' to vary along the long axis, e.g., the intensity may be higher at the edges 76, 78 than at the midpoint 80. For the image 66' produced by the rotated lens 46a', FIG. 7 shows that the beam stops 52, 68 trim more of the beam at the edges 76, 78 (where it has a relatively high intensity) than at the midpoint 80.

In one implementation of the system 10, each lens 46a'-c' of the lens array may be intentionally manufactured to have an optical characteristic such that the elongated image in the Fourier plane has a lower intensity at the midpoint of the elongated image than at the ends of the elongated image. With this arrangement, each lens can be rotated to reduce the intensity of the edges until the beam is substantially uniform along the long-axis.

In use, the detector 35 can be scanned along the long axis to determine a long-axis intensity profile of the beam 34 for the beam downstream of the beam stops 52, 68 and generate signal(s) indicative thereof. These signals may be sent to a processor, e.g. programmable computer (not shown) or directly to the actuator 62. The moveable mount(s) 62 may then be configured to be responsive to the signal(s) from the processor/detector to rotate one or more of the lenses 46a-c and reduce intensity variations in the measured profile.

For the system 10, portion(s) of the beam traveling along the beam path 42 may strike the stops 52, 68 and a portion of the beam may pass through the slit 72 without contacting either stop 52, 68. Thus, the stops 52, 68 may effectively aperture-limit the beam incident on the film 12. The excess energy in the tails of the beam may be dumped on the stops 52, 68, and not on the film 12. Also, advantageously, any small beam pointing deviation present in the beam upstream of the stops 52, 68 may be reduced at the stops 52, 68. Functionally, the short-axis beam stops 52, 68 may be absorptive stops, reflective stops, or refractive stops. As used herein, the term absorptive stop means a stop which absorbs more incident light than the sum of the incident light the stop reflects and refracts; the term reflective stop means a stop which reflects more incident light than the sum of the incident light the stop absorbs and refracts; and the term refractive stop means a stop which refracts more incident light than the sum of the incident light the stop absorbs and reflects. In some arrangements, a single short-axis stop 52 may be used in place of the pair of stops shown in FIGS. 6 and 7 to produce a beam profile having a steep trailing edge slope (i.e., the edge corresponding to the material that will not be re-melted during the TDX process) while leaving the leading edge unaffected.

FIG. 2 also shows that the optics module 28 may include a short-axis focusing/long-axis expanding optics unit 40 which receives light along the beam path 42 from the beam stops 52, 68. Typically, the edges of the beam stops 52, 68 at plane 50 may be imaged in the short-axis (by the short-axis focusing/long-axis expanding optics unit 40) to produce a desired intensity profile at the film 12. In one implementation, a desired intensity profile at the film 12 may include beam width (FWHM) of about 3-4 μm, an intensity uniformity better than about 5% along the flat top of the profile, and steep edge slopes that may be less than about 3 μm between the 10% and 90% of full intensity.

Figure 8:
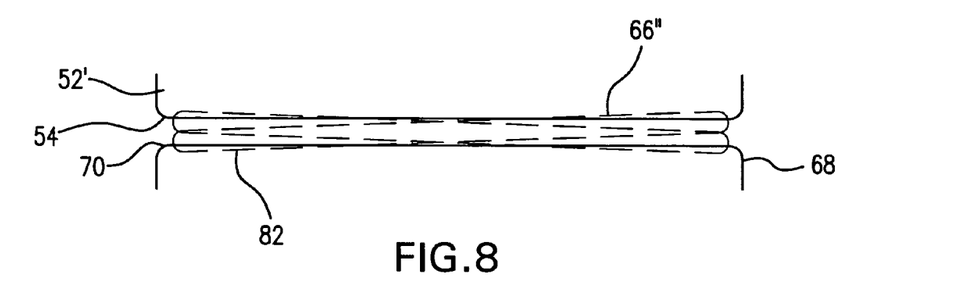
FIG. 8 shows a schematic view of a beam portion at a short-axis beam stop from a first lens rotated in a first direction and a second lens rotated in a second direction opposite to the first direction.

In one implementation, as illustrated by FIG. 8, the lenses 46 (see FIGS. 3A and 3B) in the lens array are paired together and each lens of a pair are counter rotated to the same degree of rotation to produce symmetric, counter-rotated elongated images 66", 82 as shown in FIG. 8. With this arrangement, the beam stop slit may be uniformly filled in the short axis. In one particular implementation, the two outside lenses in the linear array are paired, the two lenses next to the outside lenses are paired and so on.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. While the particular aspects of embodiment(s) of the Systems and Methods for Implementing an Interaction between a Laser Shaped as a Line Beam and a Film Deposited on a Substrate described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present Systems and Methods for Implementing an Interaction between a Laser Shaped as a Line Beam and a Film Deposited on a Substrate is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. A system for shaping and homogenizing light, said system comprising;
    a lens array having a first lens and a second lens, said lens array receiving light;
    a Fourier lens defining a Fourier plane and positioned to receive light from said first and second lenses, said Fourier lens producing a first elongated image at said Fourier plane from light from said first lens and a second elongated image at said Fourier plane from light from said second lens, said first elongated image defining a first longitudinal axis;
    a beam stop defining an edge, said edge positioned in said Fourier plane; and
    a moveable mount rotating said first lens about an axis normal to said beam stop edge to vary an alignment between said first longitudinal axis and the beam stop edge.

2. A system as recited in claim 1 wherein said lens array further comprises a third lens.

3. A system as recited in claim 1 wherein said first and second lenses are cylindrical lenses.

4. A system as recited in claim 1 wherein said second elongated image defines a second longitudinal axis and said system further comprises a second moveable mount rotating said second lens about an axis normal to said beam stop edge to vary an alignment between said second longitudinal axis and the beam stop edge.

5. A system as recited in claim 1 wherein said bean stop is a first beam stop and said system further comprises a second beam stop having a edge oriented substantially parallel to said edge of said first beam stop and spaced therefrom to establish a slit between said first and second beam stop.

6. A system as recited in claim 1 wherein said lens array is a first lens array and said system further comprises a second lens array with said first lens array positioned to receive light from said second lens array.

7. A system as recited in claim 1 wherein said system further comprises a detector positioned to receive light downstream of said beam stop, measure an intensity profile for said received light, and generate a signal indicative thereof; and wherein said moveable mount is responsive to said signal to rotate said first lens and reduce intensity variations in said measured profile.

8. A system as recited in claim 1 wherein said first elongated image at said Fourier plane has a midpoint and two ends and wherein said first lens is shaped to produce a first elongated image having a lower intensity at said midpoint than at said ends.

9. A system as recited in claim 1 wherein said moveable mount rotates said first lens in a first rotation direction and said second lens in a second rotation direction opposite to said first rotation direction.

10. A system as recited in claim 1 wherein said light is laser light.

11. An apparatus for shaping and homogenizing a light beam for interaction with a film, the beam traveling along a beam path and defining a short-axis and a long-axis, said axes being mutually orthogonal, said apparatus comprising:
    a lens array having a plurality of lenses;
    a lens positioned to receive light from said lens array and produce a respective elongated image in a plane for each lens in said lens array;
    a short axis beam stop defining an edge, said edge positioned in said plane; and
        a moveable mount rotating a lens of said lens array to vary an alignment between one of said elongated images and the beam stop edge; and
        an optic positioned along the beam path between said beam stop and said film for focusing said beam in the short-axis for interaction with the film.

12. An apparatus as recited in claim 11 wherein said optic expands said beam in the long-axis for interaction with the film.

13. An apparatus as recited in claim 11 wherein said lens array is a linear array of cylindrical lenses.

14. An apparatus as recited in claim 11 wherein said apparatus comprises moveable mounts rotating each lens of said lens array to vary an alignment between each elongated images and the beam stop edge.

15. An apparatus as recited in claim 11 wherein said short-axis beam stop is a first short-axis beam stop and said apparatus further comprises a second short-axis beam stop having a edge oriented substantially parallel to said edge of said first short-axis -beam stop and spaced therefrom to establish a slit between said first and second short-axis beam stop.

16. An apparatus as recited in claim 11 wherein said lens array is a first lens array and said apparatus further comprises a second lens array with said first lens array positioned to receive light from said second lens array.

17. An apparatus as recited in claim 11 wherein said apparatus further comprises a detector positioned to receive light downstream of said optic, measure an intensity profile for said received light, and generate a signal indicative thereof; and wherein said moveable mount is responsive to said signal to rotate said lens and reduce intensity variations in said measured profile.

18. A method for shaping and homogenizing a light beam for interaction with a film, the beam traveling along a beam path and defining a short-axis and a long-axis, said axes being mutually orthogonal, said method comprising the acts of:
    providing a lens array having a plurality of lenses;
    positioning a lens to receive light from said lens array and produce a respective elongated image in a plane for each lens in said lens array;
    disposing an edge of a short axis beam stop in said plane;
        locating an optic along the beam path between said beam stop and said film for focusing said beam in the short-axis for interaction with the film; and
        rotating a lens of said lens array to vary an alignment between one of said elongated images and the beam stop edge.

19. A method as recited in claim 18 wherein said lens array is a linear array of cylindrical lenses.

20. A method as recited in claim 18 wherein said apparatus further
    measuring an intensity profile for light downstream of said optic and generating a signal indicative thereof; and
    rotating said lens in response to said signal to reduce intensity variations in said measured intensity profile.

21. A method as recited in claim 18 wherein said plane is the Fourier plane of said lens positioned to receive laser light from said lens array.

22. A method as recited in claim 18 wherein said optic expands said beam in the long-axis ear interaction with the film.

* * * * *